United States Patent [19]

Islas

[11] Patent Number: 4,979,476

[45] Date of Patent: Dec. 25, 1990

[54] COUNTER-BALANCE SYSTEM FOR COUNTER-ROTATING TWIN-SHAFT RECIPROCATING ENGINE

[76] Inventor: John J. Islas, 6980 Lincoln Knolls N., Canastota, N.Y. 13032

[21] Appl. No.: 526,380

[22] Filed: May 21, 1990

[51] Int. Cl.$^5$ ............................................. F02B 75/06
[52] U.S. Cl. ...................... 132/192 B; 123/197 A C; 74/603
[58] Field of Search ....... 123/192 R, 192 B, 197 A C; 74/603, 604, 44

[56] References Cited

U.S. PATENT DOCUMENTS

| | | | |
|---|---|---|---|
| 3,059,418 | 10/1962 | Johnston | 74/44 |
| 4,690,113 | 9/1987 | Deland | 123/197 A C |
| 4,898,041 | 2/1990 | Islas | 74/44 |

FOREIGN PATENT DOCUMENTS 954019 11/1956 Fed. Rep. of Germany ... 123/192 B

*Primary Examiner*—Noah P. Kamen
*Attorney, Agent, or Firm*—Wall and Roehrig

[57] ABSTRACT

A reciprocating engine has a plurality of cylinders, each with a piston that travels between top dead center and bottom dead center. A pair of parallel counter-rotating cranks are joined by respective connecting rods to piston rod that passes through the plane defined by the axes of the cranks. This construction permits the rotary motion of the cranks to exceed 180° during either the compression or the power stroke of the piston and to be correspondingly less than 180° for the other. To avoid having bending or buckling forces applied to the connecting rods, the piston rod is sufficiently long that the couplings of the piston rod and the connecting rods remain disposed to the side of the plane of the cranks that is remote from the piston for all travel of the piston between top dead center and bottom dead center positions. The mechanical advantage as between power and compression strokes can exceed 2:1, yielding a favorable mechanical advantage for the expanding combustion gas in the cylinder chamber. The dwell at top dead center can be minimized to achieve high torque at low engine speed. A counterbalance system comprises one or more counterweights for each piston, the counterweights being constrained to linear travel parallel to the piston travel. Each counterweight has a connecting rod journalled to one of the crank arms for the associated piston. The reciprocating motion of the counterweights is substantially opposite to the motion of one or more of the other pistons.

6 Claims, 5 Drawing Sheets

COUNTER-BALANCE SYSTEM FOR COUNTER-ROTATING TWIN-SHAFT RECIPROCATING ENGINE

BACKGROUND OF THE INVENTION

This invention relates to reciprocating engines such as gasoline or diesel internal combustion engines, as well as to Stirling or other external combustion engines. The term engine as used herein is not limited only to prime movers or power sources, but can also be applied to other reciprocating devices such as piston type pumps and compressors.

In a typical reciprocating engine, a piston oscillates within a cylinder, and defines within the cylinder a chamber of variable volume. This chamber has minimum and maximum volumes, respectively, at piston positions corresponding to top dead center, (where the piston is closest to the cylinder head), and to bottom dead center, (where the piston is closest to the crank or other drive linkage).

In a conventional internal combustion engine, a combustion or power stroke normally occurs at the phase of the cycle in which the piston travels from top dead center to bottom dead center. Conversely, a compression stroke occurs on the phase in which the piston travels from bottom dead center to top dead center. In an internal combustion engine, the maximum forces occurring on the power stroke far exceed the maximum forces sustained on the compression stroke. In order to provide more stable and smoother operation, and to reduce internal forces on the drive linkages, it is desirable for the power stroke to occupy less than 180° of crank travel. This provides a greater mechanical advantage to the expanding gas within the chamber because of the optimization of rotation angle to the power stroke.

There have been several previous attempts to alter the power stroke by employing toggle linkage systems that connect a piston to a pair of parallel, counter-rotating cranks. Two such systems are described, for example, in U.S. Pat. Nos. 1,585,796 of May 25, 1926, and 2,392,921, of Jan. 15, 1946.

In these previous patented systems, the piston reciprocates on a line perpendicular to a plane defined by the axes of the two cranks. The length of the connecting rods that connect the piston to the crank is proportioned, with respect to the length of the crank and the distance between the two crank shafts, so that the angle between the connecting rods is less than 90° when the piston is at bottom dead center.

While these previous attempts reduced the crankshaft rotational angle that corresponded to a power stroke, these particular twin-crank drive mechanisms have not proved to be entirely practicable. One reason for this is that there is a high compressive force on the drive linkage, that is, the piston pushes against the connecting rod. The highly elevated compressive forces, especially after combustion on the power stroke, tend to buckle or break the connecting rods, and can also cause heavy wear on the wrist pins where the connecting rods are journalled to the cranks.

An improved drive linkage for a reciprocating engine is described in U.S. Pat. No. 4,898,041, of Feb. 6, 1990. In that engine, each piston travels in its associated cylinder between top dead center (TDC) and bottom dead center (BDC). A pair of counter-rotating cranks have crank arms joined by respective connecting rods to their associated pistons. The two cranks define a crank plane perpendicular to the piston travel, with the rotary motion of the cranks for piston travel from TDC to BDC being less than 180° (e.g. 130°) and from BDC to TDC being more than 180° (e.g., 230°). The piston rod extends from the piston to the connecting rods between and below the crank axes so that the lower end of the piston rod is below the crank plane for all aspects of piston travel. With this engine there is substantially reduced dwell just after top dead center, because for a given rotation angle of the cranks in the vicinity of top dead center, the piston descends from TDC substantially twice as far as the piston ascends to reach TDC. This engine operates with increased torque and power, and greater fuel economy, as well as with the ability to produce significant torque at low speeds (i.e., below 2000 rpm).

Unfortunately, because of the uneven motion of the pistons relative to crank rotation, even where crank rotation speed is uniform, the piston motion is difficult to balance. This is the case even for multiple-piston engines. In fact, in a four-cylinder version of this engine, there is a brief interval in each rotation of the cranks in which all four pistons are ascending. While this does not cause severe problems at low speeds, whenever the speed exceeds about 2000 rpm, the engine vibrations become significant. Counterweights on the cranks or on the flywheel will not balance the uneven piston motion.

OBJECTS AND SUMMARY OF THE INVENTION

It is an object of this invention to provide a balanced drive linkage for a plural-piston reciprocating engine which avoids the drawbacks of the prior art.

It is a more particular object of this invention to provide a counter-balance for a linkage that converts the reciprocatory motion of two or more pistons to a rotary motion, in such a manner that the rotary motion that corresponds to the travel of the piston from the top dead center position to the bottom dead center position is significantly smaller from 180°, and the rotary motion corresponding to travel of the piston from bottom dead center to the top dead center position is correspondingly larger than 180°.

Another object of the present invention is to reduce the dwell time in a multiple-piston internal combustion engine to gain optimum mechanical advantage from the fuel at the time when it has its greatest potential, so that the energy of combustion can be fully utilized before dissipation.

A more specific object is to provide a multiple-piston internal combustion engine of this type which will operate smoothly over a wide speed range.

According to an aspect of this invention, a reciprocating engine has two, four, or more pistons that each travel in a respective cylinder between top dead center and bottom dead center positions, and has a pair of parallel counter rotating cranks that are joined by respective connecting rods to the pistons, with parallel axes that define a crank plane. The rotary motion of the cranks for travel of the pistons from top dead center to bottom dead center is significantly below 180°, e.g. 130°, and the rotary motion of the cranks for piston travel from bottom dead center back to top dead center is correspondingly above 180°, e.g. 230°. The piston rods extend from the piston between the crank axes, and are journalled to the connecting rods below the crank plane such that the pivotal couplings of the piston rod and the connecting rods remain disposed below the crank plane and remote from their associated pistons for all travel of the pistons between top dead center and bottom dead center. As a result of this construction, the piston transmits, through the piston rod, a pulling or tensive force to the connecting rods under all phases of high force loading. It is only during a portion of the intake phase that there is a compressive force on the connecting rods, but this force is quite small compared to the forces sustained on the compression and power phases. Because of the symmetrical nature of the twin crank system, the compressive force on the piston rod is always disposed along its length, so there is no torsional or buckling moment on the rod itself. This type of system is much more robust and durable than the earlier constructions, as described in the above-mentioned U.S. patents. The connecting rods will not reach a snap-over position that occurs in related devices of the prior art.

The reciprocating engine according to this invention permits the drive cycle to be tailored for optimum use of the combustion gases in the cylinder. In an internal combustion engine, the fuel-air mixture tends to detonate, and discharge its total energy over the length of the power stroke. To avail of this energy, the dwell time at top dead center must be kept small. The mechanical advantage of the piston to the crank should be adjusted so as to move faster, but at a relatively constant high speed, during the power stroke, and at a slower speed during the remainder of the cycle. With the reciprocating engine of this invention, it is possible to achieve twice the mechanical advantage of a conventional single-crank system. With this engine, for about the first thirty degrees after top dead center the pistons descend approximately twice as far as the pistons ascend over the corresponding thirty degrees ahead of top dead center; this minimizes dwell at top dead center.

For a four-cylinder, four-stroke engine, two of the four pistons travel up and down together and the other two pistons travel at a phase separation of 180° from the first two pistons. Because of the asymmetry of motion, the first two pistons do not counterbalance the motion of the other two. However, in the engine of this invention each piston has a counterweight connected to a second connecting rod that is joined to one of the associated crank arms. The counterweight is constrained to travel in a linear, or at least generally linear, reciprocating path. The motion of the counterweights of the first two pistons is opposite to the motion of the second two pistons, while the motion of the counterweights of the second two pistons is opposite to the motion of the first two pistons. Thus, the counterweights for each pair of pistons counterbalance the motions of each other pair of pistons. A two-stroke, two-cylinder engine can be constructed this way, as can various multiple cylinder engines.

The counterweights can be appropriately restrained by third and fourth cranks disposed in the crank plane, by a pivot arm which achieves arcuate, but acceptable, reciprocal motion, or by a slide or post on which the counterweight slidably moves.

The above and many other objects, features, and advantages of this invention will be more fully understood from the ensuing description of a preferred embodiment, which should be considered in connection with the accompanying drawing.

Figure 1:
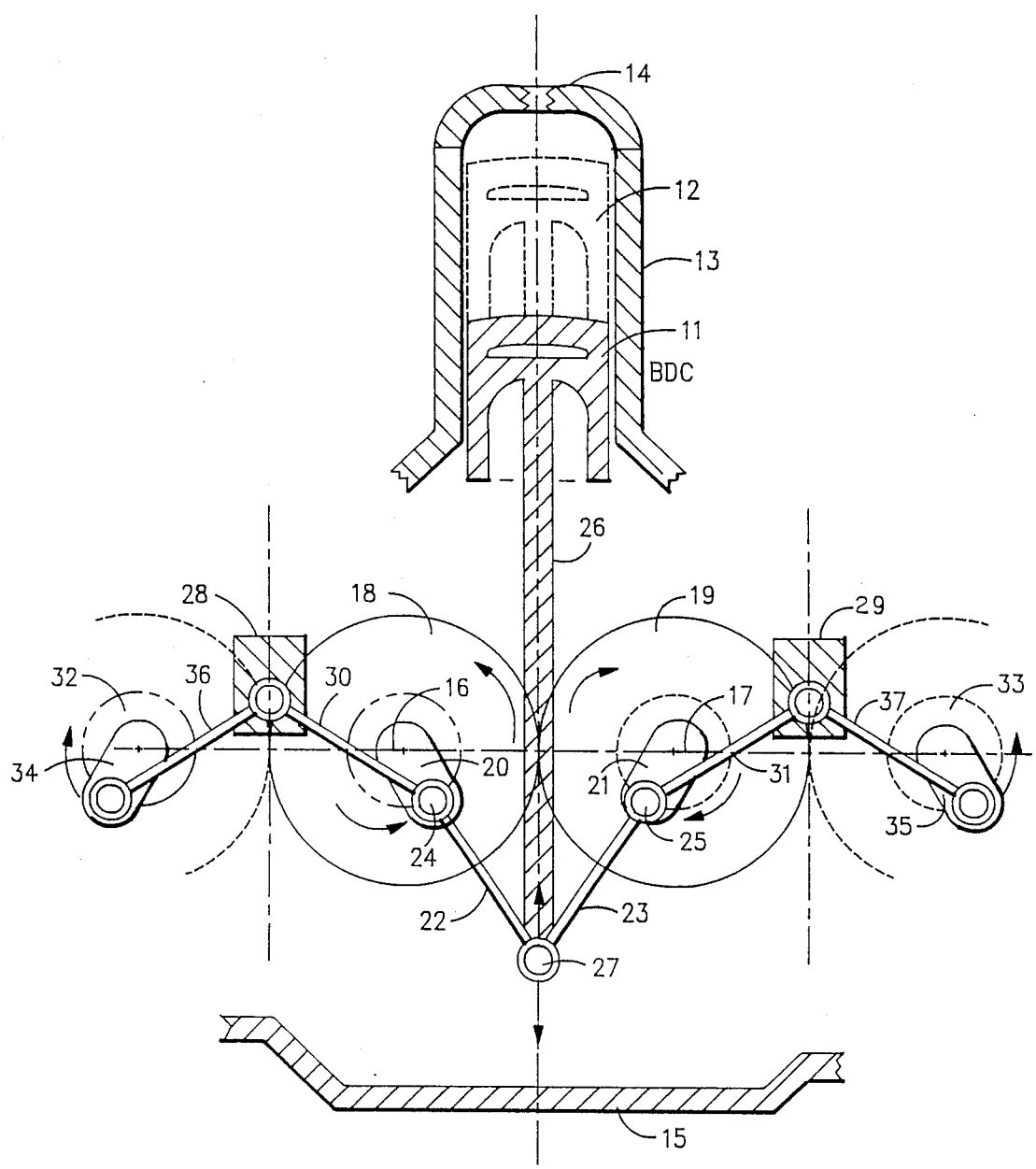
FIGS. 1 and 2 are schematic sectional elevations of one piston of a four-piston reciprocating internal combustion engine that incorporates the principles of this invention, showing bottom dead center and top dead center positions, respectively, and showing a drive linkage and counter-balancing mechanism according to a first embodiment of this invention.

DETAILED DESCRIPTION OF THE PREFERRED EMBODIMENT:

The Drawing figures illustrate an internal combustion engine of the general type disclosed in my U.S. Pat. No. 4,898,041, granted Feb. 6, 1990. That disclosure is incorporated herein by references.

Figure 2:
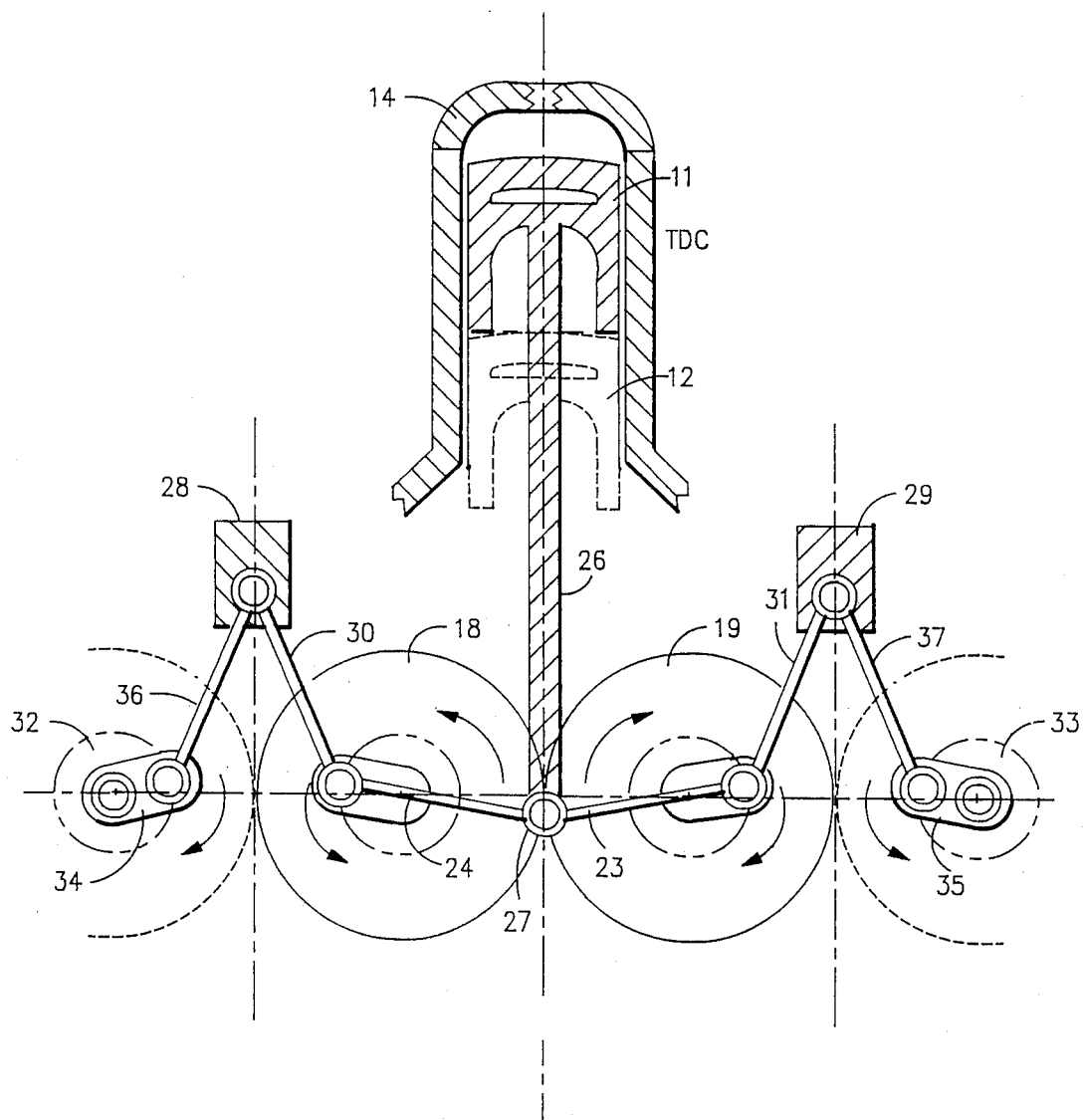

With reference initially to FIGS. 1 and 2 of the Drawing, one preferred embodiment of this invention is constituted as an in-line, four-cylinder, four-stroke internal combustion engine 10, which can be gasoline or diesel. The engine is shown with a number-one piston 11, and a number-two piston 12 directly behind it and illustrated in broken line. A number-three cylinder moves in phase with the number-two piston 12, and a number-four piston moves in phase with the number-one piston 11. These two pistons are not illustrated in these two drawing views. Each of the pistons moves in an associated cylinder 13 between bottom dead center (BDC) and top dead center (TDC) positions. The number-one piston 11 is shown in these two positions in FIGS. 1 and 2, respectively. Each cylinder has a head 14 at its upper end and couples to a crankcase 15 common to all cylinders. Each piston reciprocates in its cylinder 13 between the top dead center and bottom dead center positions.

In this engine, there is a left crank 16 and a right crank 17 which have rotary axes that define a horizontal plane through the center line of the cranks 16 and 17. A pair of spur gears 18 and 19 connected with these cranks are of equal diameter with the same number of teeth, causing the cranks 16 and 17 to rotate at the same speed but in opposite directions. A crank arm 20 and a crank arm 21 of the respective cranks 16 and 17 are joined to respective connecting rods 22 and 23 by means of journals 24 and 25. Each piston has a vertical piston rod 26 that extends from the piston 11,12 downward and through the crank plane. A distal or lower end of the piston rod 26 is joined by means of a pivot pin or wrist pin 27 to an end of each of the connecting rods 22 and 23.

As shown in FIG. 2, even at the highest position of the piston 11 the pivot pin 27 is positioned below the crank plane, i.e., on the side of the crank axes that is remote from the piston 11,12. This means that during each entire power stroke, as well as during each entire compression stroke of the engine, the cranks 16,17 and the piston rod 26 exert pulling forces on the connecting rods 22 and 23. Consequently, there is no tendency for these connecting rods 22 and 23 to bend or buckle, and, additionally, wear on the journals 24 and 25 and on the wrist pin 27 is kept to a minimum.

At the beginning of a compression stroke, the piston 11 lies at bottom dead center, as shown in FIG. 1, and the cranks 16 and 17 are at a bottom dead center position, BDC. In this particular illustrative arrangement, the rotation takes place upwards on the inner part of the crank circles, and the rotation extends from bottom dead center position BDC to the top dead center position TDC shown in FIG. 2. This involves a crank angle of about 230°. The following power stroke, which commences when the piston 11 reaches the position shown in FIG. 2, starts at zero degrees top dead center TDC, and continues about 130° to bottom dead center BDC. In this particular embodiment, the crank travel corresponding to a power stroke is significantly less than 180°, and the crank travel corresponding to the compression stroke correspondingly exceeds 180°. The geometry of the crank arms 20,21, the connecting rods 22,23, and the horizontal separation between the cranks 16,17 can be tailored to achieve the optimum mechanical advantage for any particular engine application.

Because there is a 130° phase angle between TDC and BDC, while at the same time there is a 180° phase angle difference from the numbers one and four pistons to the numbers two and three pistons, there is a segment of each rotation in which all four pistons are travelling upwards at the same time. Consequently, the four pistons do not balance one another out. Therefore, in this embodiment additional counterbalancing structure is included and incorporated onto the crank system. The counter balancing system is shown for the number one piston 11, but the remaining pistons have similar elements.

There are left and right counterweights 28 and 29 joined by connecting rods 30 and 31 to the crank arms 20 and 21, respectively. There are additional counter-rotating cranks 32 and 33 disposed in the crank plane and beyond the cranks 16 and 17, respectively. These additional cranks have crank arms 34 and 35 oriented to rotate in phase opposition to the crank arms 16,17. The crank arms 34 and 35 are journalled to connecting rods 36 and 37 which are respectively journalled to the counterweights 28 and 29. The connecting rods 30,36 and 31,37 are coupled to the counterweights by counterweight pivots 38,39 that are constrained to move on a vertical axis (i.e. parallel to the motion of the piston 11) and at all times remain above the crank plane.

With this arrangement, the counterweights sustain upward motion over a crank angle of about 230° and downward motion over an angle of about 130°. However, the counterweight motion is in general phase with the motion of the associated piston, but is opposite to the motion of the two pistons that are oppositely phased. That is, the counterweights 23,29 associated with the number-one piston 11 counterbalance the motion of the number-two piston 12. Correspondingly, the counterweights associated with the number-two piston 12 counterbalance the motion of the number-one piston 11. The number-three and number-four piston counterweights similarly counterbalance the number-four piston motion and the number-three piston motion, respectively.

Figure 3:
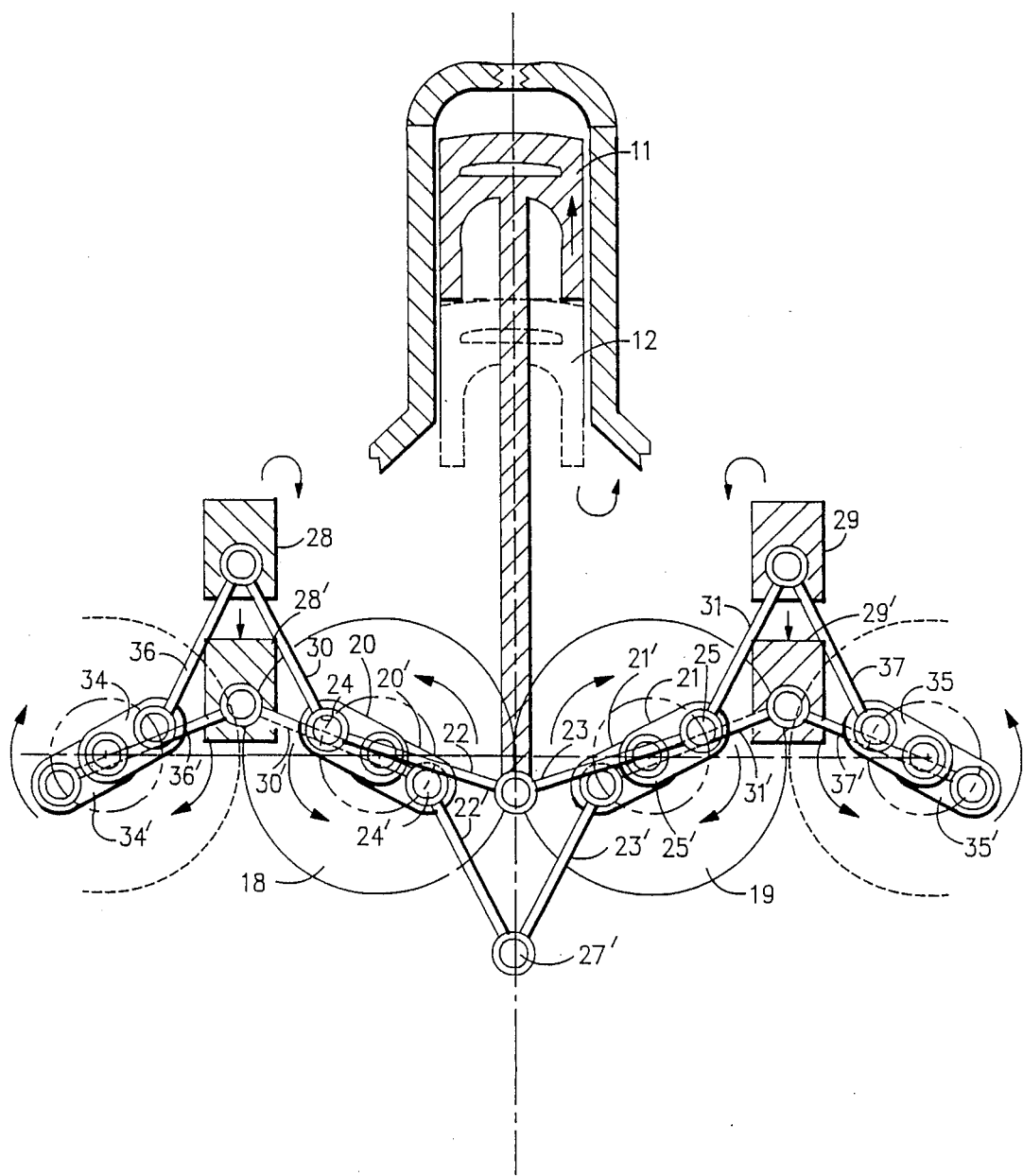
FIG. 3 is a schematic view showing the simultaneous motion of a pair of pistons and associated drive linkages and counter-balancing mechanisms of the embodiment of FIGS. 1 and 2.

The counterbalancing effect of this embodiment can be understood with reference to FIG. 3 wherein similar reference numbers are employed to identify the elements introduced earlier with reference to FIGS. 1 and 2. Here the number-one piston 11 is shown approaching top dead center, and the number two piston 12 has already passed bottom dead center and is ascending. The remainder of the mechanism that is associated with piston 12 has primed reference numbers, those associated with piston 11 being unprimed. The counterweights 28,29, 28' and 29' operate in opposition to the pistons 12 and 11, respectively, as explained earlier.

The crank arms 20,21 are 180° away from the crank arms 20',21', and the crank arms 34',35' are 180° away from the crank arms 34',35'. The effect of this is that the counterweights 28 and 29 have a motion that is opposite to that of the piston 11, (as well as opposite to the number-four piston), and the counterweights 28' and 29' have a motion that is opposite to the motion of the piston 12 (as well as opposite to the number-three piston). This keeps the engine center of gravity constant at all times. It should be noted that even at the times when all pistons are ascending, this balance is maintained as all counterweights are similarly descending.

Figure 4:
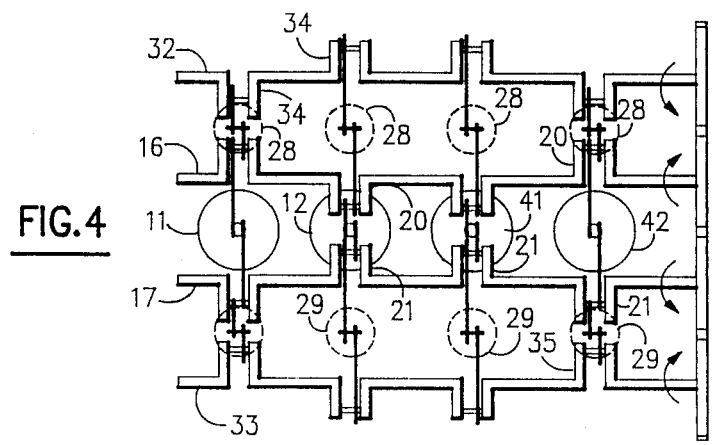
FIG. 4 is a schematic plan view of the engine of FIGS. 1 to 3.

FIG. 4 is a schematic plan view of the four-cylinder engine embodiment described above. Here numbers one, two, three, and four pistons 11, 12, 41 and 42 each have associated counterweights 28,29 as well as the connecting rods and linkages illustrated and described earlier, with shafts 16,17,32,33 and crank arms 20,21,34,35. In this embodiment there are eight counterweights for the four pistons.

Figure 5:
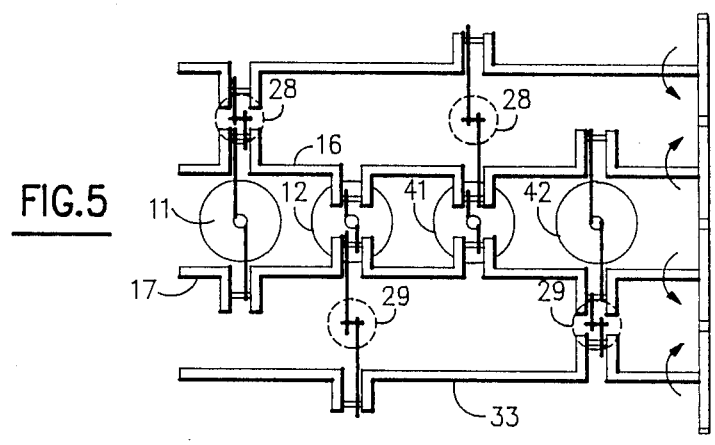
FIGS. 5 and 6 are schematic views of second and third embodiments of this invention.

A second embodiment of the invention is shown in FIG. 5, which is similar in all respects to the embodiment of FIGS. 1–4, except that there are only four counterweights 28,28, 29,29 for the four cylinders. The counterweights would each be proportionally larger in this embodiment. The positions of the counterweights are staggered, i.e., alternating from between the cranks 16 and 32 and between the cranks 17 and 33.

Counterweights 28 are associated with the numbers one and three pistons 11 and 41, while the counterweights 29 are associated with the numbers two and four pistons 12 and 42.

Figure 6:
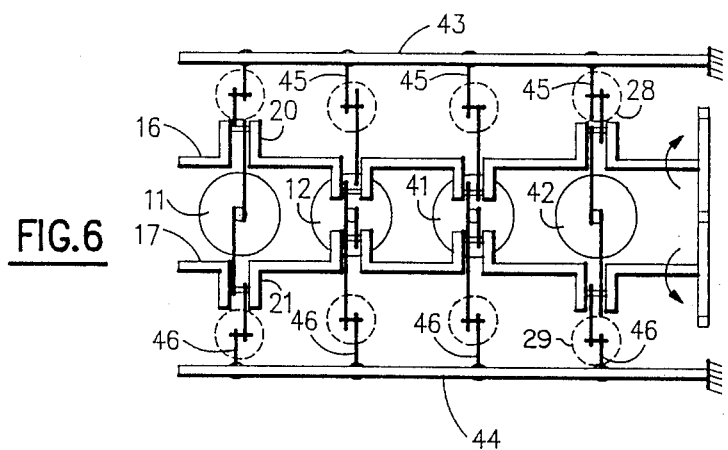

A third embodiment of this invention is shown in FIG. 6, in which the elements that are identical with those in previous embodiments are identified with the same reference numbers. Here rather than the two additional cranks 32,33 the engine is provided with pivot rods 43 and 44 on which pivot arms 45 and 46 are pivotally mounted. These pivot arms are journalled to the counterweights 28 and 29. This constrains the counterweights to move in a somewhat arcuate, but generally vertical motion. While there is a horizontal component to the counterweight travel, the two counterweights 28,29 for each piston balance one another in this regard, leaving a vertical component only for each pair of counterweights.

Figure 7:
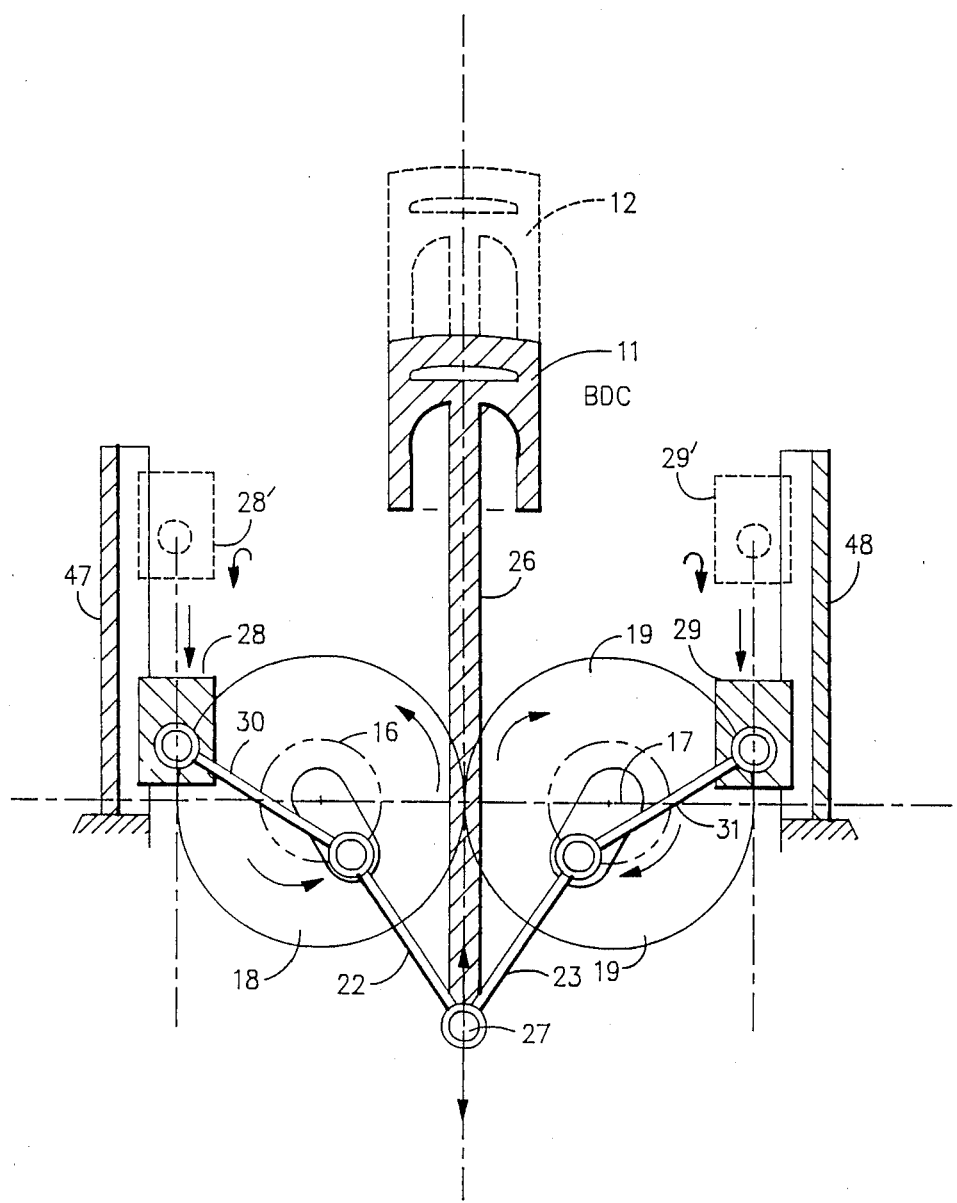
FIG. 7 is a schematic sectional elevation of a fourth embodiment of this invention.

A fourth embodiment of this invention is shown in a schematic elevation in FIG. 7, in which similar elements to those in the embodiment of FIGS. 1–4 are identified with similar reference numbers. In this embodiment, the outer cranks 32 and 33 are disposed with and vertical tracks or linear bearings 47 and 48 are disposed for each piston, and the counterweights 28 and 29 are slidably fitted to them. The linear bearings 47 and 48 serve as means to restrain the motion of the counterweights 28 and 29 to a vertical axis. Each piston can have associated with it a pair of bearings 47,48 and counterweights 28,29 or the bearings and counterweights can be arranged alternately, i.e. one set per piston, in the fashion of the embodiment of FIG. 5.

In any of the above, the counterweights can take the form of additional pistons for compressing air. This can provide a source of compressed combustion air for air injection, if for example, the engine is configured as a two-stroke engine.

Although the present invention has been described in detail with reference to a single preferred embodiment, it should be understood that the invention is not limited to that precise embodiment. For example, the engine could employ, two, six, eight, or more cylinders, rather than four cylinders as is illustratively shown. This theory can also be applied to a counterbalance system for a one-cylinder engine, or for engines of any odd numbers of cylinders. Also, the theory of this invention could be readily applied to a piston type pump or compressor. Thus, many modifications and variations of this embodiment would present themselves to those of skill in the art without departing from the scope and spirit of this invention, as defined in the appended claims.

What is claimed is:

1. A multiple-piston reciprocating engine of the type in which each piston travels in an associated cylinder between top dead center and bottom dead center positions and in which first and second counter-rotating cranks have crank arms that are joined by respective connecting rods to its associated piston, and whose axes define a crank plane, such that the rotary motion of the cranks for travel of the pistons from the top dead center position to the bottom dead center position is significantly different from 180 degrees and the rotary motion of the cranks for the travel of the pistons from the bottom dead center position to the top dead center position is correspondingly different from 180 degrees in the complementary sense, and wherein from each piston a piston rod extends between the crank axes and is pivotally coupled to said connecting rods, and comprising a counter balancing mechanism for the pistons including at least one counterweight for each piston, means constraining each said counterweight to travel in a generally linear reciprocating path that is generally parallel to the motion direction of the pistons, each counterweight coupled to a counterweight connecting rod and journalled to one of the crank arms for the associated piston, such that the reciprocating motion of each said counterweight is substantially opposite to that of at least one of the other pistons of said engine.

2. The multiple-piston engine of claim 1, wherein said means for constraining the counterweights includes a third and a fourth crank disposed in said crank plane beyond said first and second cranks, respectively, and which counter-rotate with respect to the associated first and second cranks, said third and fourth cranks having a crank arm for each said counterweight with an additional connecting rod being journalled to such crank arm and to the associated counterweight.

3. The multiple-piston engine of claim 2, wherein for each piston there are two of said counterweights, one disposed midway between said first and third cranks and the other midway between said second and fourth cranks.

4. The multiple-piston engine of claim 2, wherein for each piston there is a single counterweight, and wherein for alternate pistons the counterweights are situated midway between the first and third cranks and for the remaining pistons the counterweights are situated midway between the second and fourth cranks.

5. The multiple-piston engine of claim 1, wherein said means for constraining said counterweights includes a pair of pivot arms for each said piston, each having one end pivoting on a pivot axis in said crank plane outside the first and second cranks, with said counterweights being journalled on another end of said pivot arm such that for each piston two said counterweights move arcuately such that the component of motion for each counterweight toward and away from the piston line of motion balances the corresponding component of motion of the other counterweight for that piston.

6. The multiple-piston engine of claim 1, wherein said means for constraining the counterweights includes for each said counterweight a linear bearing oriented substantially parallel to the direction of motion of said pistons, and means on said counterweight slidably mounting the same on said linear bearing.

* * * * *